July 18, 1939.  J. BRISCOE ET AL  2,166,390
RELIEF VALVE
Filed July 13, 1938    3 Sheets-Sheet 1
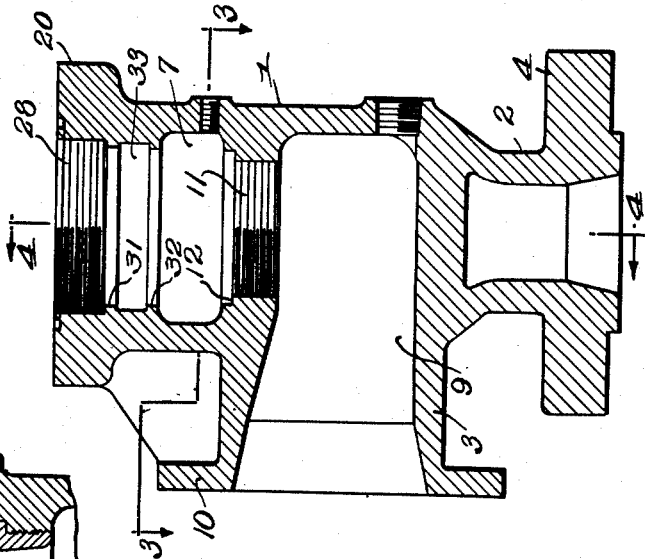
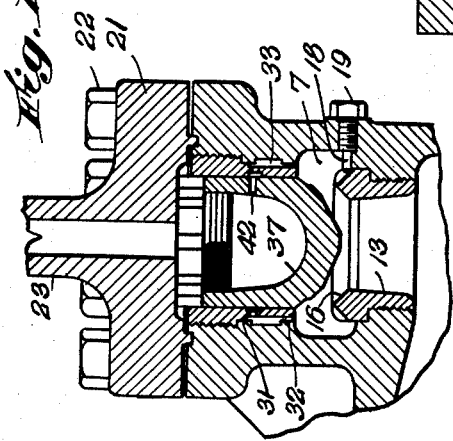
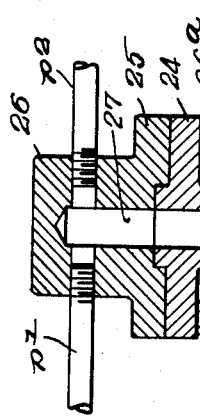
Inventors
James Briscoe
James L. Corcoran
By Roberts Cushman & Woodberry
Attys.

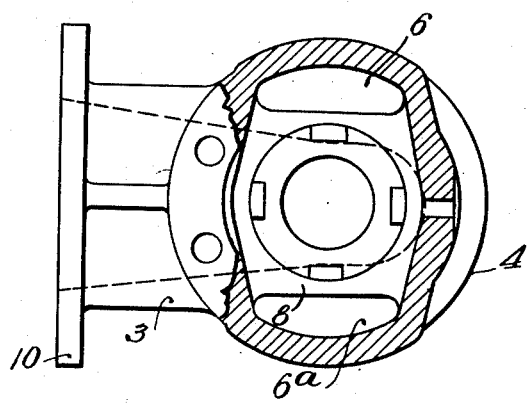
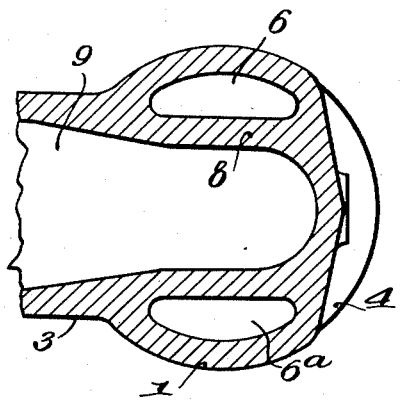
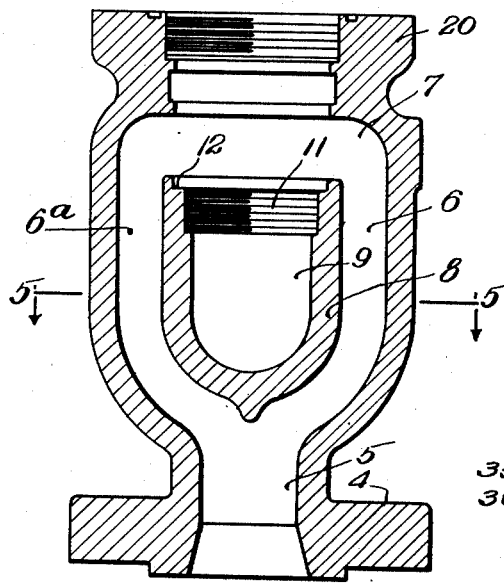
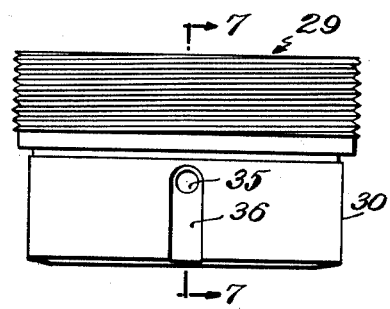
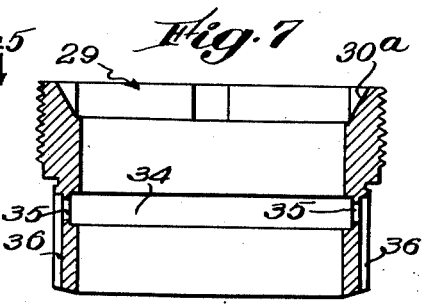

July 18, 1939.　　J. BRISCOE ET AL　　2,166,390
RELIEF VALVE
Filed July 13, 1938　　3 Sheets-Sheet 3

Inventors:
James Briscoe
James L. Corcoran
by Roberts Cushman & Woodberry
Attys.

Patented July 18, 1939

2,166,390

UNITED STATES PATENT OFFICE 2,166,390

RELIEF VALVE

James Briscoe and James L. Corcoran, Bridgeport, Conn., assignors to Manning, Maxwell & Moore, Incorporated, New York, N. Y., a corporation of New Jersey Application July 13, 1938, Serial No. 218,984

3 Claims. (Cl. 137—53)

This invention pertains to valves for use in pressure fluid systems, and relates more particularly to a pressure-loaded relief valve and constitutes an improvement upon the valve disclosed in the patent to Darling No. 1,500,674, dated July 8, 1924.

As pointed out in the patents to Graesser No. 1,951,049, dated March 13, 1934, and Beck et al. No. 2,059,722, dated November 3, 1936, pressure-loaded relief valves embodying the principle of operation of the Darling patent are highly useful when the relief valve must be exposed to temperatures such that a valve loading spring would soon deteriorate, for instance, when the relief valve is connected to the discharge end of a superheater. The Graesser patent suggests how a pressure-loaded valve of the Darling type, located at the discharge end of a superheater, may be remotely controlled by electrical means, while the Beck et al. patent indicates one way of remotely controlling such a relief valve by fluid pressure.

In the Darling type of valve, the valve feather is normally held to its seat by pressure fluid in a back pressure chamber to which the rear side of the feather is normally exposed. Pressure fluid enters this back pressure chamber only by leaking past the valve feather. When the pressure in the back pressure chamber is suddenly released, as by the operation of a control valve, the valve feather is free to leave its seat in response to the fluid pressure acting against its front face. When the control valve is closed, pressure fluid leaks past the valve feather into the back pressure chamber and eventually establishes such a pressure in the latter as to force the valve feather back to its seat.

As specifically disclosed in the Darling patent, the opening of the pressure-loaded relief valve is initiated by the blowing of an auxiliary "pop" safety valve of substantially usual type directly associated with the pressure-loaded valve and exposed to steam of substantially the same character and at substantially the same pressure as the relief valve. As already noted, the closure of the Darling relief valve is dependent upon leakage of pressure fluid past the valve feather into a back pressure chamber, but, in order to ensure rapid opening, the leakage clearance between the feather and its guide must be quite small.

When the release of pressure fluid from the back pressure chamber is controlled by a pop safety valve, as suggested by Darling, it has been observed that there is a slight lag between the closing of the pop valve and the seating of the relief valve feather by reason of the time necessary, after the pop valve closes, for steam to leak past the skirt of the relief valve feather into the back pressure chamber. This lag has the effect of slightly prolonging the blow-down. While this slight delay may not be serious at ordinary pressures, it becomes of substantial consequence when dealing with steam at high pressures and/or temperatures where prolonged blow-down means great waste of heat energy.

Although the Darling valve was designed primarily for use with saturated steam, it has been found useful, as already suggested, to relieve the pressure at the delivery end of a superheater, but when the valve parts are exposed to the very high temperature of superheated steam, it is even more difficult than when dealing with saturated steam so to proportion the feather and its guide as to ensure leakage sufficient to close the valve quickly without permitting so much leakage as to interfere with proper opening. This is in part due to the much greater expansion of the metal of the valve at such high temperatures than at lower temperatures, and in some measure perhaps to the difference in size of the molecules of saturated steam and those of superheated steam.

The principal object of the present invention is to provide an improved pressure-loaded valve of the Darling type useful under a wide range of conditions, including those encountered in saturated and in superheated steam practice, and capable of opening promptly under substantially all such conditions in response to release of pressure in the back pressure chamber and of closing very promptly with a low blow-down as soon as the outlet to the back pressure chamber is closed.

A further object is to provide a valve of improved construction particularly useful, for example, in such a system as that disclosed in the patent to Beck et al. supra, wherein the relief valve is located at the discharge of a superheater exposed to high temperatures and remotely controlled.

Other objects and advantages of the invention will be made manifest in the following more detailed description and by reference to the accompanying drawings, wherein Fig. 1 is a vertical section through the valve casing showing the valve feather seated;

Fig. 1ª is a fragmentary sectional view on the same plane as Fig. 1, but showing the valve feather open;

Fig. 2 is a section on substantially the same plane as Fig. 1, showing the valve casing proper, but without the valve feather and seat;

Fig. 3 is a fragmentary plan view, partly in horizontal section, on the line 3—3 of Fig. 2, but showing the valve seat in place;

Fig. 4 is a vertical section substantially on the line 4—4 of Fig. 2;

Fig. 5 is a fragmentary horizontal section substantially on the line 5—5 of Fig. 4;

Fig. 6 is a side elevation, to larger scale than

Figure 8:
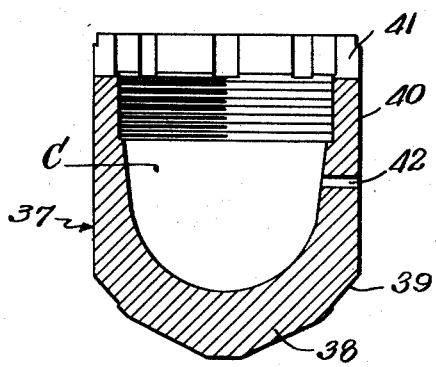
Figure 9:
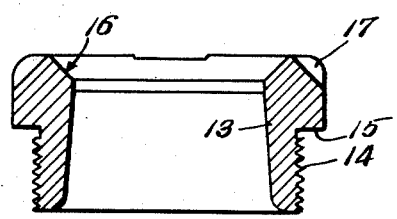
Figure 10:
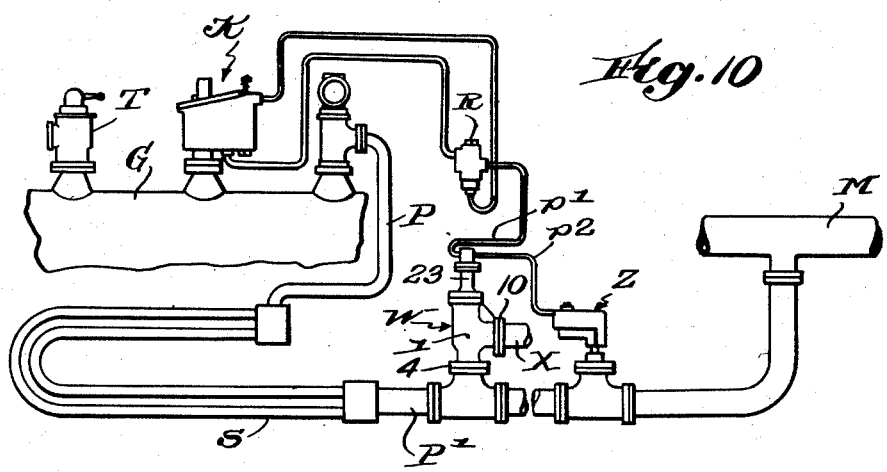

Fig. 1, showing the valve feather guide sleeve or bushing;

Fig. 7 is a vertical section substantially on the line 7—7 of Fig. 6;

Fig. 8 is a vertical section, to larger scale than Fig. 1, showing the valve feather;

Fig. 9 is a vertical section, to larger scale than Fig. 1, showing the valve seat; and Fig. 10 is a diagrammatic elevation illustrating the improved valve as arranged in a fluid pressure system such as disclosed in the patent to Beck et al, supra.

While it is to be understood that the improved relief valve of the present invention is useful in substitution for the relief valve of the Darling patent and in direct combination with a pop-type control valve, it has herein been illustrated by way of example as installed at the delivery end of a superheater, and remotely controlled in response to temperature variations in the boiler and superheater, like the relief valve of the Beck et al. patent above referred to.

Thus, as shown merely by way of example in Fig. 10, the improved relief valve W of the present invention is connected to the delivery end of the superheater S which receives steam from the generator G through the pipe P and delivers it through a pipe p' to a steam main M. The generator G has one or more of the usual safety valves T and a control valve K which may be identical, if desired, with the control valve K of the aforementioned Beck patent and designed to respond to a predetermined temperature in the drum or generator, thereby to permit generator steam to flow to the housing of a relay valve R (like the valve R shown in the Beck patent). However, the valve K may, if desired, be replaced by one which responds to pressure rather than temperature. The delivery pipe p' leading from the superheater is also provided with a control valve Z which may be like the valve Z of the Beck patent and which also responds to temperature variations, but such valve may be replaced by a valve which responds to pressure if desired. The valves R and Z are connected to the improved relief valve W by pipes $p^1$ and $p^2$, respectively, and when either of the valves K or Z functions, pressure fluid is permitted to escape from the casing of the valve W through one or the other pipes $p^1$ or $p^2$, respectively, as hereinafter more fully described.

Referring to Figs. 1 to 9 of the drawings, the improved relief valve is shown as comprising a casing 1 which may be a casting, forging or the like, having a substantially vertical lower portion 2 and a horizontal portion 3, the part 2 being provided with an attaching flange 4 by means of which the casing may be secured to a fitting of usual type through which steam is admitted to the casing 1. The casing has a single inlet passage 5 at its lower part, but preferably this passage forks to provide spaced upwardly extending portions 6 and 6ª (Fig. 4) which merge at the upper part of the casing to form the inlet chamber 7. A septum 8 (preferably an integral portion of the casing, and which, as shown in Fig. 4, is of more or less U-shape in vertical section) separates the passages 6 and 6ª from the outlet passage 9 which is in the horizontal portion 3 of the casing. This horizontal part of the casing is provided with a flange 10 at its end by means of which an exhaust pipe X (Fig. 10) may be secured to the casing so as to receive the exhaust steam from the outlet passage 9 and conduct it to any desired point of discharge.

The upper wall of the septum 8 is provided with an internally screw-threaded passage 11 having a substantially horizontal shoulder 12 at its upper end. This passage is designed to receive the seat ring 13 (Fig. 9) which is externally screw threaded at 14 for engagement with the screw threads at 11 and which has a shoulder 15 designed to fit snugly against the shoulder 12 of the casing. This seat ring 13 is provided with a beveled seat surface 16 for engagement with the valve feather and preferably is provided with slots 17 designed selectively to receive a pin 18 (Fig. 1) projecting from the inner end of a set screw 19 having screw-threaded engagement with an opening in the casing wall,—the pin 18 being arranged to project into one of the slots 17 and thus to prevent rotation of the seat ring.

The upper end of the casing is provided with a flange 20 to which a top closure 21 is secured by means of bolts 22. This closure 21 is provided with an upwardly extending tubular stem 23 having a flange 24 (Fig. 1) at its upper end designed to receive the flange 25 of a cap 26 which may be secured to the flange 24 by means of bolts 26ª and which has a passage 27 forming a continuation of the exhaust passage within the tubular stem 23 and having internally screw-threaded branches for the reception of the ends of the pipes $p^1$ and $p^2$ (Fig. 10), respectively.

The upper part of the casing 1 is provided with a chamber (whose upper part is internally screw threaded at 28) designed to receive the valve guiding sleeve or bushing 29. This sleeve (Figs. 6 and 7) is externally screw threaded at its upper part for engagement with the screw threads at 28, and at its lower part it has a cylindrical portion 30 of reduced external diameter which fits snugly within a pair of vertically spaced annular ribs 31 and 32 (Fig. 2) projecting from the inner surface of the casing 1 and defining between them an annular recess 33.

The upper end of the sleeve 29 preferably is provided with a plurality of slots or recesses 30ª, and about midway the length of this sleeve it is furnished with an internal peripheral recess 34 (Fig. 7) from which lead radial passages 35, opening at their outer ends into vertical slots 36 extending down to the lower end of the sleeve. When the sleeve 29 is properly seated in the upper part of the casing 1, the slots 36 provide communication at all times between the inlet chamber 7 of the casing and the annular recess 33 which in turn always communicates with the interior recess 34 by means of the passages 35.

The valve feather 37 (Fig. 8) preferably is of deep cup-shape, having the head 38 provided with the annular beveled surface 39 designed to cooperate with the surface 16 of the seat ring, and comprising a substantially cylindrical hollow skirt portion 40 which is designed to slide within the sleeve 29. The interior of the valve feather, with the cooperating lower surface of plate 21, constitutes the back-pressure chamber C. Preferably the feather is provided with slots or recesses 41 at its upper edge. The chamber C has an inlet port 42 through the thickness of that portion of the skirt 40 which is always within the guide sleeve 29, by means of which the chamber C communicates with the annular recess 34 in the guide sleeve 29 when the valve feather is unseated.

The operation of the device is substantially as follows, it being assumed that normally the valve feather 37 is seated, as shown in Fig. 1; that pressure fluid fills the inlet chamber 7 and that such fluid has leaked between the valve feather and the guide sleeve 29 into the back pressure chamber C so as to hold the valve feather against its seat in opposition to the pressure of the fluid in inlet chamber 7; and that the control devices K and Z are inactive so that the exhaust passage 27 leading from the back pressure chamber C is closed. The area of the valve feather which is exposed to the pressure fluid in the chamber 7 is less than the effective area of the valve feather which is exposed to the pressure fluid in the back pressure chamber, and thus under such conditions the relief valve feather 37 remains closed until the pressure in the back pressure chamber drops substantially. At this point it may be noted that the clearance between the valve feather 37 and the guide sleeve 29 is such that a slow leakage only of pressure fluid from the inlet chamber 7 to the back pressure chamber C can take place. Thus when the exhaust passage 27 is opened there is not enough leakage past the valve feather to interfere with prompt opening.

Assuming now that either of the control devices K or Z becomes active, thus opening an outlet from the exhaust passage 27 and allowing pressure in the back pressure chamber C suddenly to drop, the unbalanced pressure acting against the surface of the valve feather 37 exposed in chamber 7 immediately opens the valve to its fullest extent, thus permitting pressure fluid rapidly to escape from the chamber 7 through the orifice in the valve seat 13 into the delivery passage 9.

As the valve feather rises to its full open position the port 42 comes into registry with the peripheral recess 34 at the inside of the guide sleeve 29 and, as this recess always communicates by means of the openings 35 and the longitudinally extending channels 36 with the inlet chamber 7, pressure fluid is freely admitted through the port 42 to the back pressure chamber C. Since the recess 34 extends around the entire periphery of the guide seeve, any such rotation of the valve feather within the guide sleeve as may take place during use does not interfere with the intended operation.

As soon as the exhaust passage 27 is closed by the restoration of the controller device K or Z to normal condition, the pressure fluid which is flowing freely into the back pressure chamber from the inlet chamber 7 through port 42 as above described at once builds up pressure in the back pressure chamber sufficient quickly to reseat the valve feather 37. This reseating of the valve feather takes place almost instantaneously upon closure of the exhaust passage 27 by the action of the controller device K or Z so that there is substantially no prolongation of the blow-down period after the control device calls for closure of the relief valve.

As the valve feather approaches its seated position, the port 42 moves out of registry with the recess 34 so that pressure fluid is no longer free to enter the back pressure chamber and can thereafter only reach said chamber by slow leakage past the valve feather. Thus the present improvement results in no interference with the desired prompt opening of the valve when the relief passage 27 is next opened, since the back pressure chamber is thereby almost instantaneously exhausted.

While one desirable embodiment of the invention is herein disclosed by way of example, it is to be understood that the invention is not necessarily limited to this precise arrangement but is to be regarded as broadly inclusive of all equivalent constructions such as fall within the terms of the appended claims.

We claim:

1. A pressure relief valve of the kind having an inlet chamber, an outlet chamber having an annular valve seat defining an orifice leading from one of said chambers to the other, a valve feather cooperable with said seat to close said orifice, the feather normally being held to its seat by pressure fluid in a back pressure chamber having a normally closed exhaust passage, the valve feather comprising a substantially cylindrical skirt portion, and a guide sleeve within which the skirt portion of the valve feather slides with a clearance sufficiently small to prevent leakage of pressure fluid past the skirt of the feather into the back pressure chamber fast enough to prevent prompt opening of the valve when the exhaust passage is opened, characterized in that the skirt of the feather has a port through that portion thereof which is always within the guide sleeve, the latter having an admission passage leading from the inlet chamber and with whose inner end the port in the feather registers when the valve is fully open.

2. A pressure relief valve of the kind having an inlet chamber, an outlet chamber having an annular valve seat defining an orifice leading from one of said chambers to the other, a valve feather cooperable with said seat to close said orifice, the feather normally being held to its seat by pressure fluid in a back pressure chamber having a normally closed exhaust passage, the valve feather comprising a substantially cylindrical skirt portion, and a guide sleeve within which the skirt portion of the valve feather slides with a small leakage clearance such as to permit slow leakage of pressure fluid from the inlet chamber into the back pressure chamber when the feather is seated, characterized in that the skirt of the feather has a port through that portion of its wall which is always within the guide sleeve, the latter having a peripherally extending recess in its inner surface with which the port in the skirt of the feather registers when the valve is fully open, the sleeve also having a plurality of longitudinally extending admission passages leading from the inlet chamber to said peripherally extending recess.

3. A pressure relief valve of the kind having an inlet chamber, an outlet chamber having an annular valve seat defining an orifice leading from one of said chambers to the other, a valve feather cooperable with said seat to close said orifice, the feather normally being held to its seat by pressure fluid in a back pressure chamber having a normally closed exhaust passage, the valve feather comprising a substantially cylindrical skirt portion, and a guide sleeve within which the skirt portion of the valve feather slides with a small leakage clearance such as to permit slow leakage of pressure fluid from the inlet chamber into the back pressure chamber when the feather is seated, characterized in that the skirt of the feather has a port through that portion of its wall which is always within the guide sleeve, the latter having a peripherally extending recess in its inner surface with which the port in the skirt of the feather registers when the valve is fully open, and means operative constantly to supply pressure fluid to said peripheral recess.

JAMES BRISCOE.
JAMES L. CORCORAN.